(12) United States Patent
Lim et al.

(10) Patent No.: US 6,870,295 B2
(45) Date of Patent: Mar. 22, 2005

(54) OSCILLATING MOTOR AND MOTOR CONTROL APPARATUS AND METHOD

(75) Inventors: Jun Young Lim, Inchon (KR); Yun Chul Jung, Kwangmyung (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/984,323

(22) Filed: Oct. 29, 2001

(65) Prior Publication Data

US 2002/0097012 A1 Jul. 25, 2002

(30) Foreign Application Priority Data

Jan. 22, 2001 (KR) .......................................... 2001-3601
Feb. 8, 2001 (KR) .......................................... 2001-6155

(51) Int. Cl.[7] ................................................ H02K 1/00
(52) U.S. Cl. ...................... 310/216; 310/218; 310/166; 310/168; 310/26; 310/261
(58) Field of Search ................................. 310/216, 218, 310/166, 168, 26–40, 261–262

(56) References Cited

U.S. PATENT DOCUMENTS 3,062,979 A * 11/1962 Jarret ........................... 310/168
5,717,266 A * 2/1998 Maynard, Jr. ................ 310/103
5,777,421 A * 7/1998 Woodwards ................. 310/268
5,898,250 A * 4/1999 Sugita .......................... 310/166
6,429,551 B1 * 8/2002 Beetz ........................... 310/36
6,611,073 B2 * 8/2003 Kanebako ................... 310/90.5

FOREIGN PATENT DOCUMENTS

| CN | 1229300 | 9/1999 |
|---|---|---|
| JP | 49-110214 | 9/1974 |
| JP | 05-083920 | 4/1993 |
| JP | 9261994 | 10/1997 |
| JP | 11-289726 | 10/1999 |

* cited by examiner

Primary Examiner—Darren Schuberg
Assistant Examiner—Iraj A. Mohandesi
(74) Attorney, Agent, or Firm—Fleshner & Kim, LLP

(57) ABSTRACT

An oscillating motor is provided which can be reciprocally rotated within a predetermined rotation region without any conversion device for changing to a linear movement, and which can be simply connected to an existing apparatus. The oscillating motor includes a set of teeth formed on the stator which are configured to engage with a corresponding set of teeth formed on the rotor when the motor is in operation. Alternately formed concave and convex regions on the teeth increase a contact area between the rotor and stator, thus increasing torque and operating efficiency of the motor without increasing size.

19 Claims, 8 Drawing Sheets

LOW-SPEED OPERATION

FIG. 3B
BACKGROUND ART

MID-SPEED OPERATION

FIG. 3C
BACKGROUND ART

HIGH-SPEED OPERATION

OSCILLATING MOTOR AND MOTOR CONTROL APPARATUS AND METHOD

BACKGROUND OF THE INVENTION

1. Field of the Invention

The present invention relates to an oscillating motor, and more particularly, to an oscillating motor in which a concave portion and a convex portion are formed at the inner circumferential surface of a rotor and a stator to increase contact area, thereby increasing a torque of the motor, and an AC power applied to the motor is controlled to variably control the area where the rotor is reciprocally rotated, thereby increasing an efficiency of a compressor.

2. Description of the Background Art

In general, a motor controls an operation of a switching device to switch on or off a power supplied to a coil wound on a multi-phase stator, so as to generate a rotational torque. As the excitation state of the rotor and the stator of the motor is sequentially varied, a forward directional rotational torque is generated thanks to the generated magnetic suction force, and if a specific excitation state between the rotor and the stator of the motor is not varied, the rotor is stopped at a certain position.

In addition, by controlling a phase of an input pulse signal applied to the switching device with formation of the maximum inductance of the motor as the starting point, a reverse-rotational force is generated, and accordingly, the motor can be controlling in its driving and direction.

The construction of the motor will now be described with reference to FIG. 1.

Figure 1:
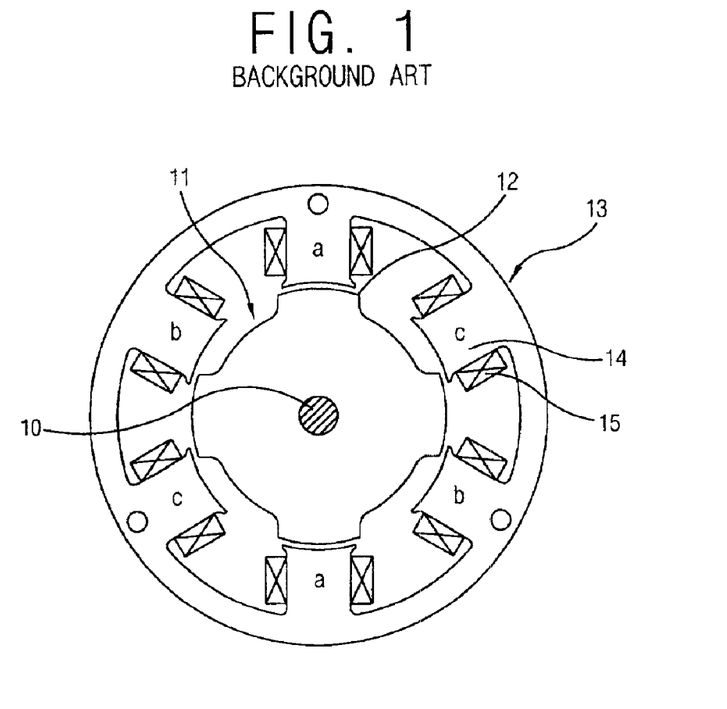
FIG. 1 is a sectional view showing a structure of a motor in accordance with a conventional art.

FIG. 1 is a sectional view showing a structure of a motor in accordance with a conventional art.

As shown in FIG. 1, the motor includes a cylindrical stator 13, a rotor 11 rotatably inserted at the inner side, a rotational shaft 10 provided at the center of the rotor 11 as an output shaft, stator teeth 14, a coil 15 wound on the stator teeth, a position detecting unit (not shown) for detecting a position of the rotor, and a controller (not shown) for controlling the motor according to a position detected by the position detecting unit.

The stator 13 includes six teeth 14 formed protruded at a certain angle (60° at the inner side of the mother body. The coil 15 is wound at each of the stator teeth 14, making stator poles. The stator poles are electrically connected to each other in the diagonal direction, to form 3 phases (a, b, c) that the same polarity is generated.

The rotor 11 includes four rotor teeth 12 formed protruded at a certain angle, that is, at a 90°, on the outer circumferential surface. The rotor teeth 12 is rotated with a void formed with an end portion of the stator teeth 14.

As an embodiment of the above-constructed motor, an SRM motor will now be described.

Figure 2:
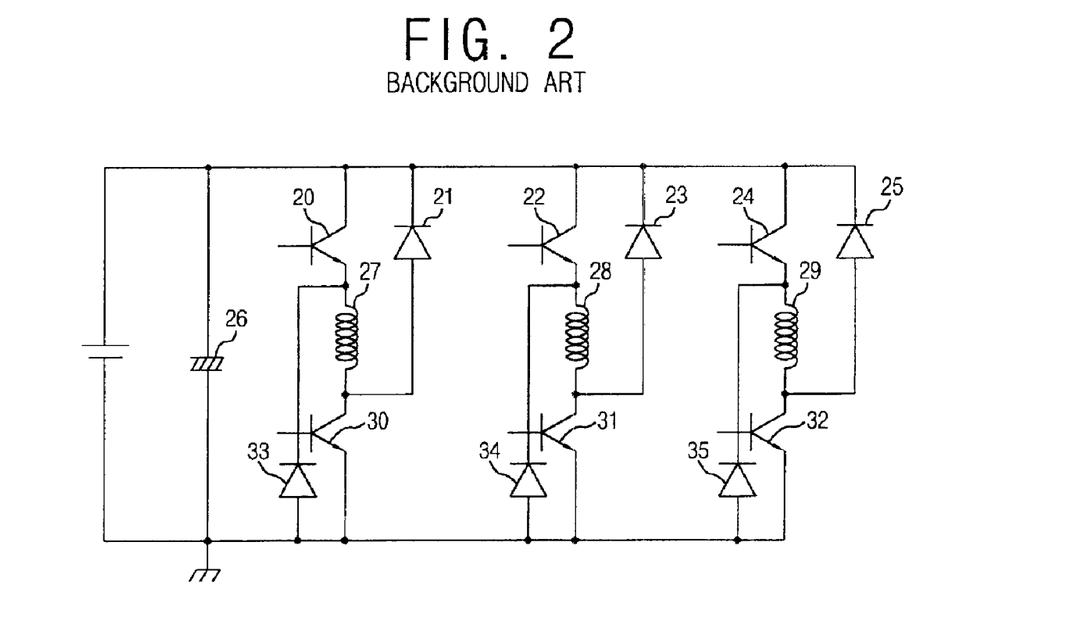
FIG. 2 is a circuit diagram showing the construction of an SRM motor in accordance with the conventional art.

FIG. 2 is a circuit diagram showing the construction of the SRM motor in accordance with the conventional art.

As shown in FIG. 2, the SRM motor includes a DC link capacitor (C) 26 for smoothing an inputted voltage and supplying the resulted DC voltage to switched reluctance motor (SRM) motor, coils 27, 28 and 29 of the 'N' number of motors respectively connected in parallel as many as the number of 'N' phases, upper switch devices 20, 22 and 24 and lower switch devices 30, 31 and 32 connected in series vertically to the coils 27, 28 and 29 of the motor, free wheel diodes 33, 34 and 35 connected between an emitter of the upper switch devices 20, 22 and 24 and an emitter of the lower switch devices 30, 31 and 32, and free-wheel diodes 21, 23 and 25 connected between a collector of the upper switch devices 20, 22 and 24 and the emitter of the lower switch devices 30, 31 and 32.

The operation of the SRM motor will now be described in detail with reference to FIGS. 1, 2 and 3A through 3C.

Figure 3A:
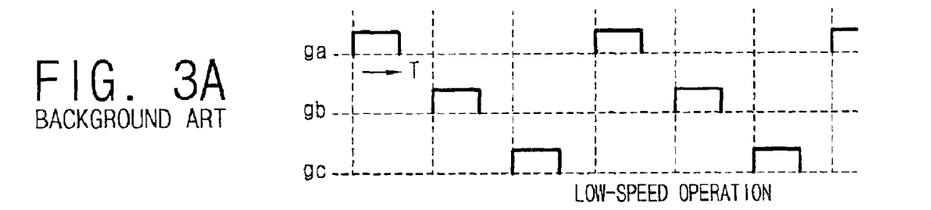
FIGS. 3A through 3C show waveforms indicating period for controlling the speed of the motor by a dwell control in accordance with the conventional art.
Figure 3B:
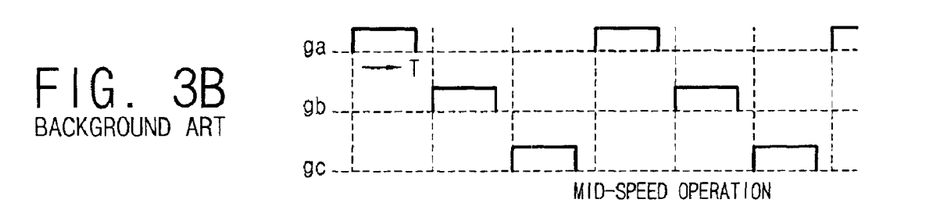
Figure 3C:
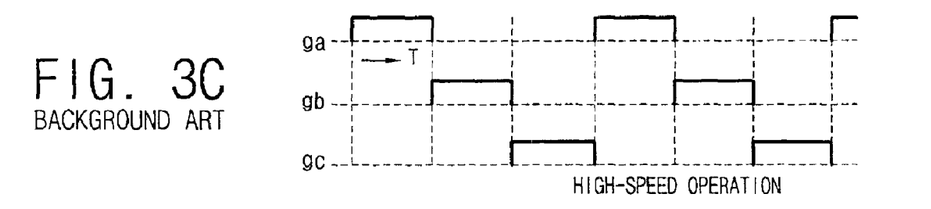

FIGS. 3A through 3C show waveforms of periods to control the speed of the motor under the dwell control in accordance with the conventional art.

As shown in FIGS. 3A through 3C, the position detecting unit detects a position of the rotor teeth 12 and outputs a position detection pulse to the rotor 11. Then, the stator 13 synchronizes the position detection pulse, applies a current to the 3 phases (a, b, c) excitation coil 15 and generates an electromagnetic force.

That is, when a voltage is inputted to the DC link capacitor 26, the DC link capacitor 26 smoothes the inputted voltage and applies it to the SRM motor.

Upon receipt of the smoothed voltage, that is, the DC voltage, the SRM motor is rotated, and by installing a motor interrupter and a disk having a slog related to each phase in the motor, the position of the rotor is detected by the photo sensor.

After the position of the rotor is detected, when the motor is operated at a low speed, as shown in FIG. 3A, the period of the gate signal (ga) for controlling the switch device of the motor is made shortened to control the current applied to the motor.

In case that the motor is operated at a middle speed, the switch device of the motor is controlled with a signal period as shown in FIG. 3B, and in case that the motor is operated at a high speed, the switch device of the motor is controlled with a signal period as shown in FIG. 3C, whereby the current flowing to the motor is controlled to rotate the motor in the forward direction or in the backward direction.

In the method for controlling the 3 phases of stator coils by the dwell time, the case that the motor is operated at a low speed will now be described in detail.

In order to generate electricity at the phase '1' of the stator coil and generate an electromagnetic force, a high level of phase 'a' gate signal (ga) is supplied to a gate of the upper and the lower switch devices 20 and 30 connected in series to the motor coil 27. When the upper and the lower switch devices 20 and 33 of the phase 'a' are turned on by the high level of gate signal as supplied, a current flows to the motor coil 27 connected in series to the upper and the lower switch device, so that electricity is generated at the motor coil 27 of the phase 'a'.

After electricity is generated at the motor coil 27 of the phase 'a' and the current flows to the motor coil 27 of the phase 'a' for a predetermined dwell time (T), a low level of gate signal (ga) is outputted to the upper and the lower switch devices 20 and 30.

When the low level signal is outputted, the upper and lower switch devices 20 and 30 are simultaneously turned on off and the magnetic flux generated at the motor coil 27 of the phase 'a' is removed while passing the DC link capacitor 26 and the motor coil 27, so that that motor is smoothly rotated.

In case that an electromagnetic force is generated at the stator coil 'b', in order generate electricity at the stator coil, the high level gate signal (gb) of the phase 'b' is supplied to the gate of the upper and lower switch devices 22 and 31 connected in series to the motor coil 28, and accordingly, the upper and lower switch devices 22 and 31 of the phase 'b' are simultaneously turned on.

As the upper and lower switch devices 22 and 31 of the phase 'b' are turned on, the current flows to the motor coil 28, and thus, electricity can be generated at the motor coil 28 of the phase 'b'.

When the electricity is generated at the motor coil 28 of the phase 'b', the current flows for a predetermined dwell time, and then the low level of gate signal (ga) is outputted to the upper and lower switch devices 22 and 31.

When the low level signal is outputted, the upper and lower switch devices 22 and 31 are simultaneously turned off, and the magnetic flux generated at the coil 28 of the motor of the phase 'b' is removed by the free wheel diodes 23 and 34, the DC link capacitor 26 and the motor coil 28, so that the motor can be smoothly rotated.

In case of the phase 'c', it also has the same operations as those of the phases 'a' and 'b', thus, descriptions are omitted.

When current is applied to the stator 13 and the motor is rotated, a microcomputer detects a position of the rotor by means of the position detecting unit and controls switching of the plurality of switch devices 20, 22, 24, 30, 31, and 32, according to which the motor is rotated in the forward direction or the backward direction.

However, as described above, though the motor can be rotated at a high speed in the forward or in the backward direction, it is incapable of making a reciprocal rotational movement at a high speed in a certain area. Therefore, it fails to be adoptable to a mechanism or a device which needs a high-speed reciprocal movement. In addition, if it is possibly adoptable, a conversion mechanism for changing a rotational movement to a linear movement is to be additionally installed, causing a problem that its expense is increased.

SUMMARY OF THE INVENTION

Therefore, an object of the present invention is to provide an oscillating motor in which a concave portion and a convex portion are formed at the inner circumferential surface of a rotor and a stator to increase contact area, and coils wound on a stator teeth in a diagonal direction are electrically connected to each other to alternately excite a current flowing to each phase of the coil, thereby making a reciprocal rotational movement even without a current conversion device.

Another object of the present invention is to provide an oscillating motor in which an AC power applied to the motor is controlled to control an operation of the motor in its reciprocal rotation, whereby a rotor of the motor can be operated in a certain rotation range.

To achieve these and other advantages and in accordance with the purpose of the present invention, as embodied and broadly described herein, there is provided an oscillating motor including: a first teeth having a concave portion and a convex portion at its front surface; a stator having the first teeth by pairs formed at an inner circumferential surface; and a rotor having a concave portion and a convex portion at the front surface of a second teeth in a manner of being engaged with the concave portion and the convex portion formed at the first teeth of the stator.

To achieve the above objects, there is also provided a control apparatus of an oscillating motor including: a motor having a concave portion and a convex portion formed at a teeth of a stator a concave portion and a convex portion at a teeth of a rotor; and a controller for controlling an AC power applied to the stator to control a reciprocal rotation area and speed of the rotor, so as for the rotor to be rotated reciprocally in the stator.

To achieve the above objects, there is further provided a motor control method including: a step in which a switching control signal is outputted according to a polarity of an AC power when the AC power is inputted; a step in which a switch device is turned on according to the switching control signal; a step in which a current is applied to the coil of the stator teeth as the switch device is turned on, so that the coil electrically connected to the coil of the stator coil and the stator teeth in the diagonal direction are simultaneously excited; a step in which the concave and the convex portions of the rotor are engaged with the concave and the convex portions of the stator in the excitation direction and rotated to reciprocally rotate in the rotational area while the contact surface is being increased; and a step in which a rotational angle of the rotor is detected and a switching control signal is variably outputted according to the detecting result.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
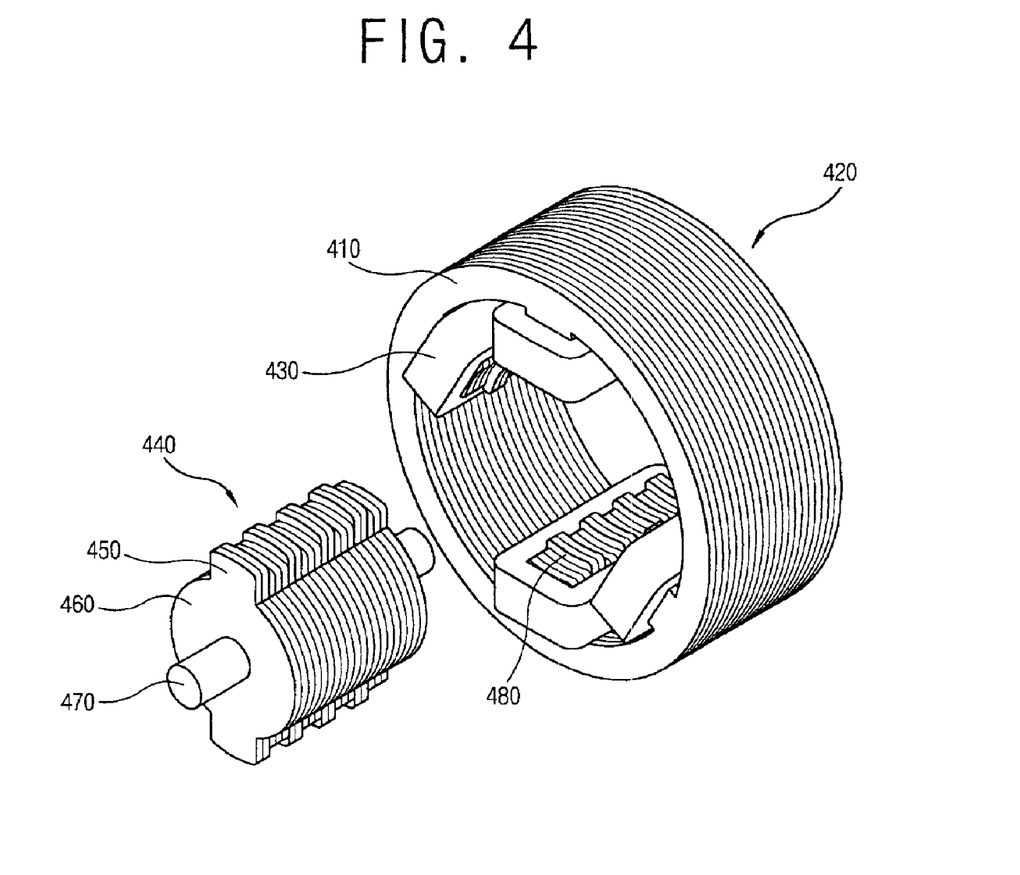
FIG. 4 is a perspective view showing an oscillating motor in accordance with a preferred embodiment of the present invention.
Figure 5:
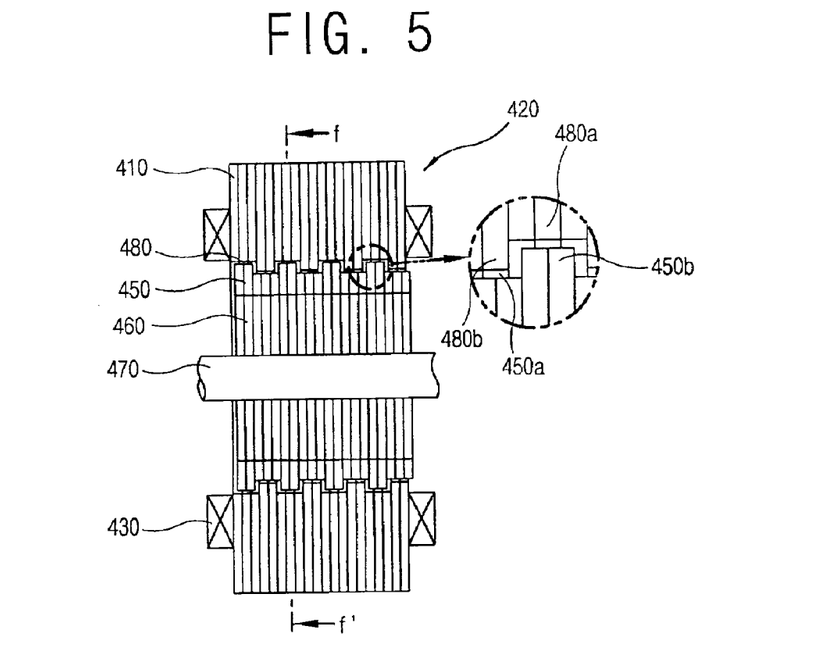
FIG. 5 is a vertical-sectional view of the oscillating motor in accordance with the preferred embodiment of the present invention.
Figure 6:
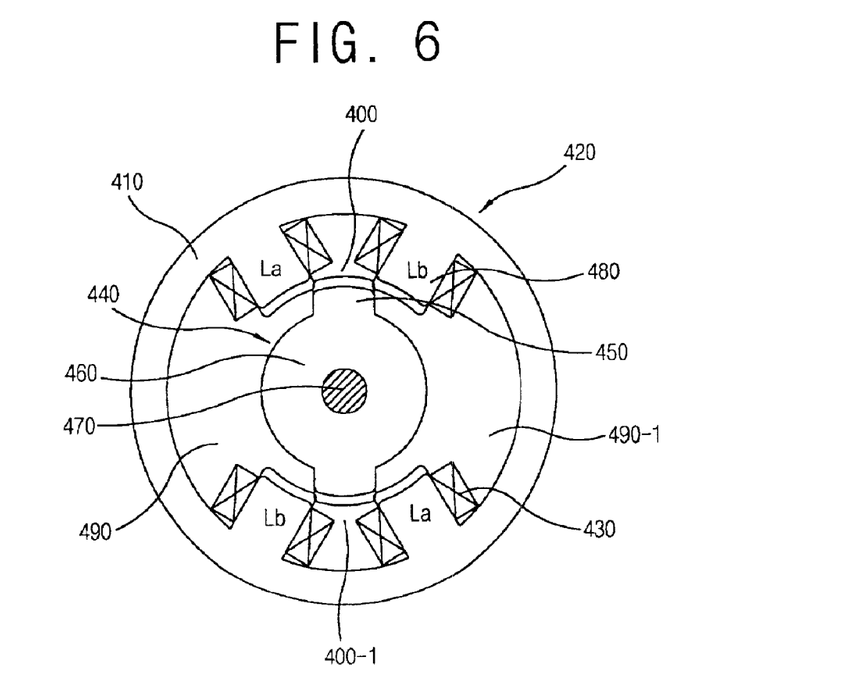
FIG. 6 is a sectional view taken along line 'f—f' of FIG. 5 in accordance with the preferred embodiment of the present invention.

FIG. 4 is a perspective view showing an oscillating motor in accordance with a preferred embodiment of the present invention, FIG. 5 is a vertical-sectional view of the oscillating motor in accordance with the preferred embodiment of the present invention, and FIG. 6 is a sectional view taken along line 'f—f' of FIG. 5 in accordance with the preferred embodiment of the present invention.

As shown in the drawings, there are provided a stator 410, a rotor 440 disposed to be rotatable at the inner side of the stator 410, and a rotational shaft 470 making the output shaft at the center of the rotor.

The stator 410 is provided with a stator core 420 that lamination sheets are stacked. A pair of stator teeth with coil wound thereon are formed at reciprocal rotation regions 400 and 400-1 of the front and rear sides except for non-rotation regions 490 and 490-1 at the inner circumferential surface of the stator core 420.

A coil 430 is wound at a stator teeth 480 to excite the stator teeth 480 by a current applied from an AC power, and a concave portion 480a and a convex portion 480b are alternately formed in the vertical direction at the front surface of the stator teeth 480.

The coil 430 wound at the stator teeth 480 are connected to each other in the diagonal direction, so that when a current is applied to the coil 430 of the stator teeth 480, the current is also applied to the coil 430 and the diagonally positioned coil 430. As the coils 430 in the diagonal direction are simultaneously excited to make one phase (La, Lb).

The rotor 440 is provided with a rotor core 460 that lamination sheets are stacked, and rotor teeth 450 is formed protruded at the front and rear sides (180° position) of the rotor core 460.

The rotor teeth 410 and the stator teeth are alternately excited so that the rotor 440 can make a reciprocal movement in the reciprocal rotation regions 400 and 400-1.

A concave portion 450a and a convex portion 450b are alternately formed in the vertical direction at the front face of the rotor teeth 450, so that they are combined with the concave portion 480a and the convex portion 480b of the stator teeth 480. Thus, the contact area between the stator 410 and the rotor 440 is increased and a flux is formed wide, and thus, a torque is increased.

The operation of the rotor teeth and the stator teeth will now be described in detail with reference to FIG. 7.

Figure 7:
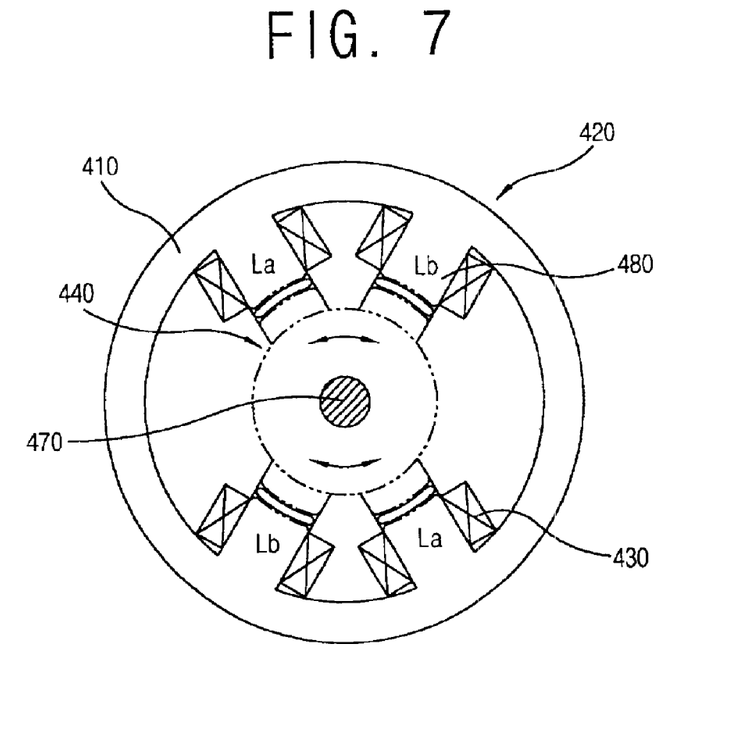
FIG. 7 is a sectional view showing a reciprocal rotation area of the motor in accordance with the preferred embodiment of the present invention.

FIG. 7 is a sectional view showing a reciprocal rotation area of the motor in accordance with the preferred embodiment of the present invention.

As shown in FIG. 7, when a current is applied to the coil 430 wound at the stator teeth 480, the electrically connected coil 430 and the diagonally-directed stator teeth 480 are simultaneously excited, and the rotor teeth 450 is rotated in a direction that a magnetic resistance is '0' to generate a rotational torque.

Since the rotor teeth is rotated in the direction that the magnetic resistance is '0', when a current is alternately applied to each phase (La, Lb) by means of the switching unit, the rotor 440 is reciprocally rotated in the excitation direction within a predetermined angle, that is, within the reciprocal rotation regions 400 and 400-1 indicated in a dotted line of FIG. 7, and the rotational shaft 470, making the output shaft of the motor, is also reciprocally rotated within a certain angle according to the reciprocal rotation of the rotor 440.

In rotation, the convex portion 450b of the rotor teeth 450 is combined to the concave portion 480a of the stator teeth 480, and the convex portion 480b of the stator teeth 480 is insertedly combined to the concave portion 450a of the rotor teeth 480, so that the flux is formed side in excitation and the torque is widely generated.

The apparatus for controlling the reciprocal rotation of the motor in the horizontal direction will now be described in detail with reference to FIGS. 8 and 9.

Figure 8:
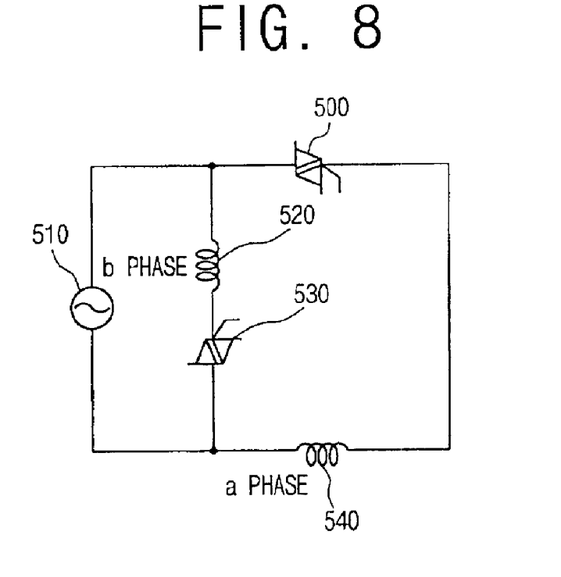
FIG. 8 is a circuit diagram showing a driving unit of the oscillating motor in accordance with the preferred embodiment of the present invention.
Figure 9A:
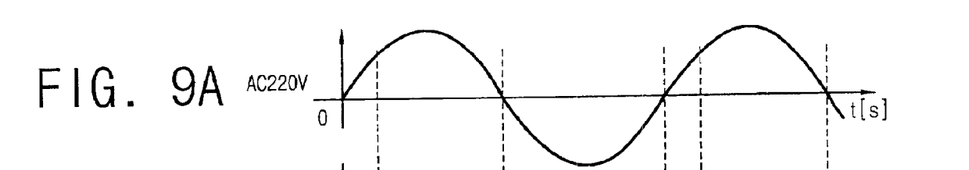
FIGS. 9A through 9E are wave forms for controlling the driving unit of the oscillating motor in accordance with the preferred embodiment of the present invention.
Figure 9B:
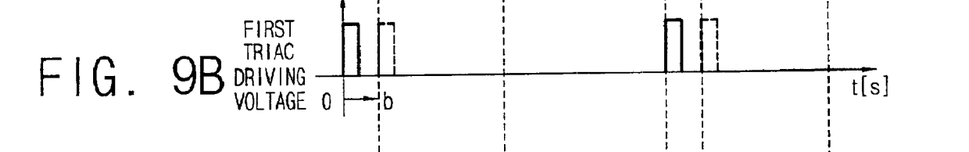
Figure 9C:
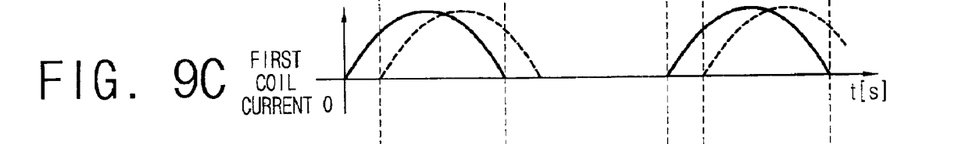
Figure 9D:
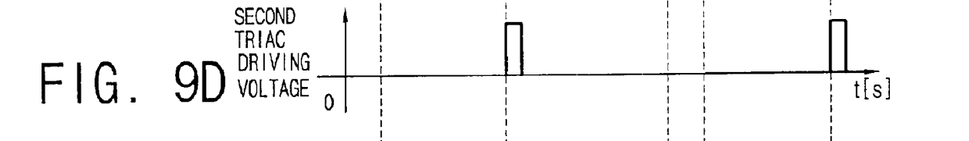
Figure 9E:
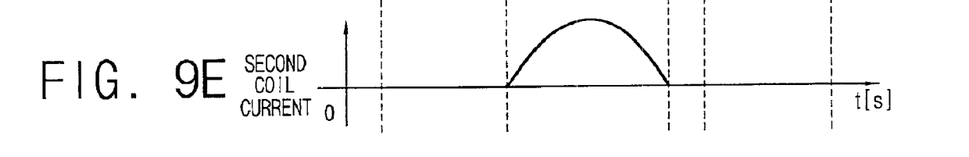

FIG. 8 is a circuit diagram showing a driving unit of the oscillating motor in accordance with the preferred embodiment of the present invention.

As shown in FIG. 8, a driving unit of the oscillating motor includes a first triac 500 being connected in series to a first coil 540 of the motor, and applying a current to the first coil 540 to excite a phase 'a' when an inputted AC is of a positive polarity; a second triac 530 being connected in series to a second coil 520, and being connected in parallel to the first coil 540 and the first triac 500 to excite a phase 'b' when the inputted AC power is a negative polarity; and a microcomputer (not shown) for controlling the first triac 500 and the second triac 530.

The operation of the driving unit constructed as described above will now be explained with reference to FIGS. 9A through 9E.

FIGS. 9A through 9E are wave forms for controlling the driving unit of the oscillating motor in accordance with the preferred embodiment of the present invention.

As shown in FIGS. 9A through 9E, when a current is applied to the coil 430 wound at the stator teeth 480, the coil 430 electrically connected to the coil 430 and the teeth 480 positioned in the diagonal direction to the electrically connected coil 430 are simultaneously excited, and the rotor teeth 450 of the rotor 440 is rotated in the direction that the SRM becomes '0' to generate a rotational torque.

At this time, when the current is alternately applied to the winding coils 540 and 520 by the first and second switching control signal applied to the first and second triacs 500 and 530, the rotor 440 repeatedly makes a forward and a backward rotation within a predetermined angle in the excitation direction. Then, according to the reciprocal rotational movement of the rotor 440, the rotational shaft 470 of the motor performs a reciprocal rotation within the predetermined angle.

That is, when the AC power is of a positive polarity, the first triac 500 is turned by the first switching control signal, and the current supplied from the power source passes the first triac 500 to the first coil 540, to excite the phase 'a'.

When the AC power is a negative polarity, the second triac 530 is turned on by the second switching control signal, and the current which has excited the phase 'a' and the current of the negative AC power flow to the second coil 520 through the second triac 530, so that the phase 'b' is excited. These operations are repeatedly performed so that the rotor 440 makes the rotational reciprocal movement.

When the rotor 440 is reciprocally rotated, the microcomputer (not shown) detects a swing angle of the motor and outputs first and second switching control signals for varying the magnitude of the voltage applied to the motor according to the detecting result, to control the first and the second triacs 500 and 530 to be alternately operated.

A duty ratio of the first and second switching control signals are varied depending on the magnitude of the voltage applied to the motor.

That is, in order to control the angle at which the rotor is rotated, after the AC power of a positive polarity is inputted, a driving voltage for turning on the first triac 500 is inputted in a predetermined time (b). Then, since the time during which the positive current flows is constant, the time during which the current flows to the first coil 540 is shortened and the angle at which the rotor 440 is rotated to excite the phase 'a' becomes small.

A control method for a case that the AC power is a negative polarity is the same as the case in which the positive current flows, descriptions of which, thus, is omitted.

The angle at which the motor is reciprocally rotated can be controlled by controlling time point for applying a driving voltage of the first and second triacs when the AC power is applied.

The effect of the oscillating motor and the control apparatus as stated above will now be described in detail with reference to FIGS. 10, 11 and 12.

Figure 10:
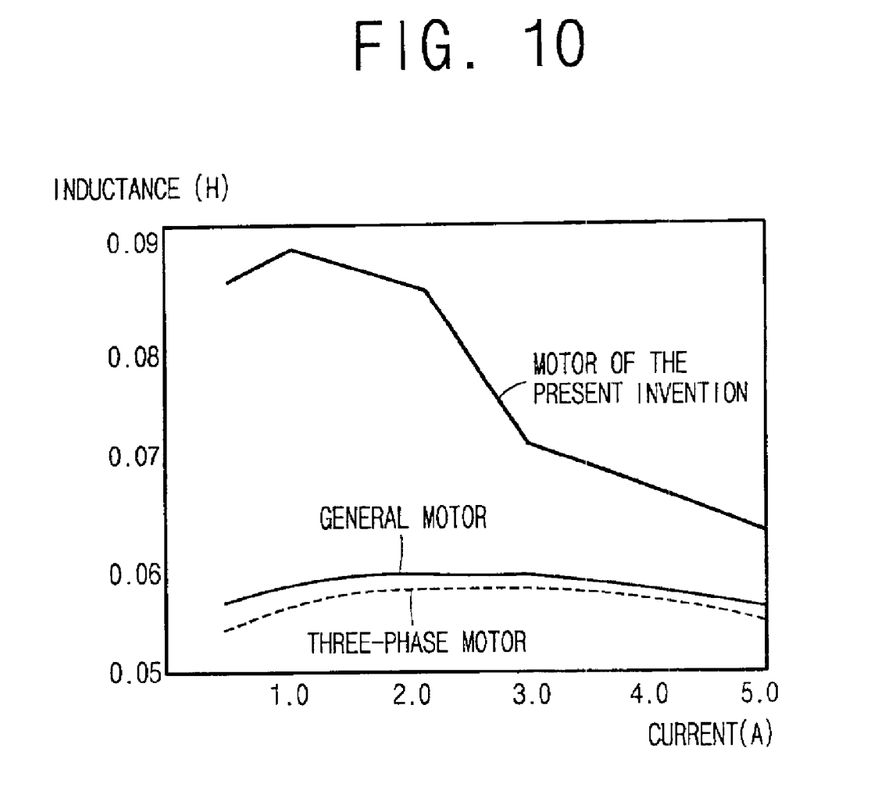
FIG. 10 is a graph showing a comparison of inductance between the motor of the present invention and that of the conventional art.

FIG. 10 is a graph showing a comparison of inductance between the motor of the present invention and that of the conventional art.

In the conventional motor, the ratio of the maximum value (Max) and the minimum value (Min) of the inductance is 3, but comparatively, the ratio of the maximum value and the minimum value of the inductance of the present invention is 4.5. Therefore, the magnetic resistance motor of the present invention exhibits a 50 increased efficiency while having the same size as that of the conventional motor.

Figure 11:
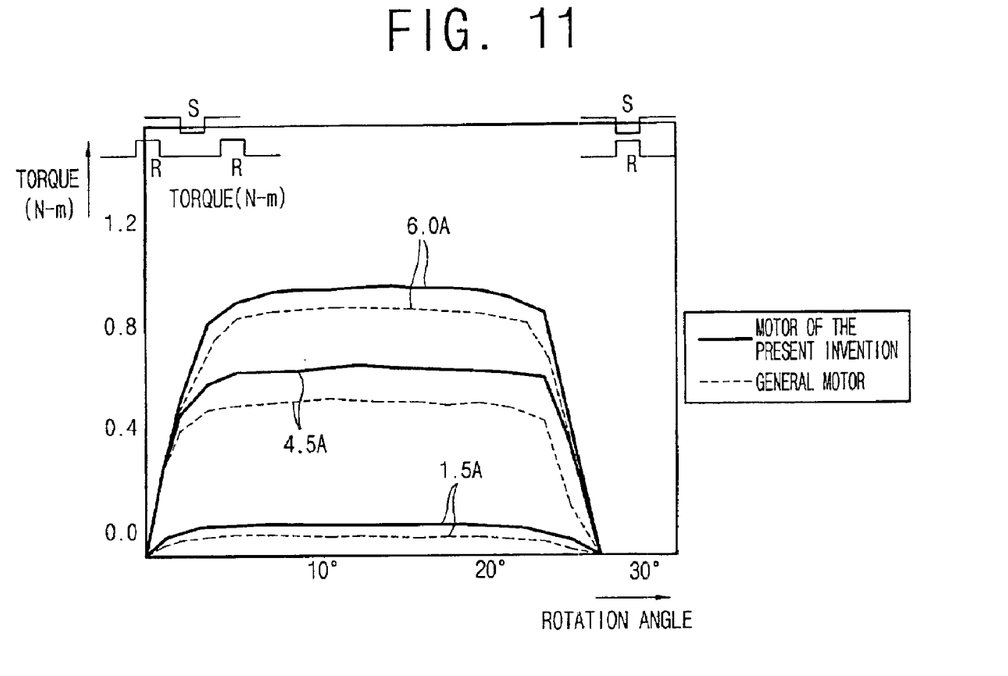
FIG. 11 is a graph showing a comparison between a static torque of the motor in accordance with the present invention and that of the conventional art.

FIG. 11 is a graph showing a comparison between a static torque of the motor in accordance with the present invention and that of the conventional art. Also in the static torque test for measuring a force of the motor at a current, the magnetic resistance motor of the present invention has about 30~45% increased torque compared to the conventional magnetic resistance motor.

Figure 12:
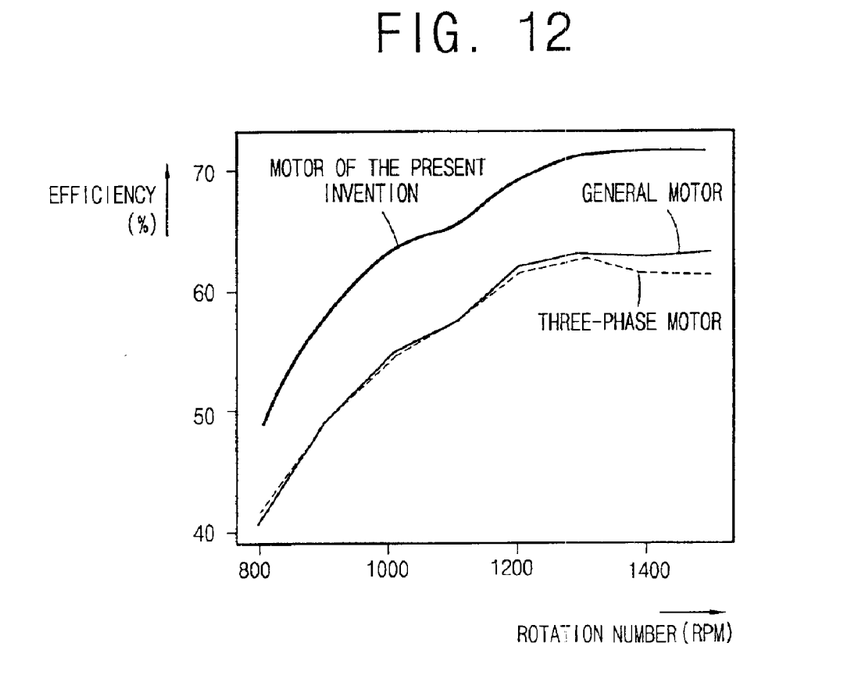
FIG. 12 is a graph showing a comparison between an efficiency of the motor in accordance with the present invention and that of the conventional art.

FIG. 12 is a graph showing a comparison between an efficiency of the motor in accordance with the present invention and that of the conventional art. According to a measurement result in a dynamo test, the magnetic resistance motor of the present invention exhibits more than 10% increased efficiency compared to the conventional magnetic resistance motor.

As so far described, according to the oscillating motor of the present invention, the coils are wound at the stator teeth of the motor and coils are electrically connected in the diagonal direction to alternately excite the current flowing to each phase in the diagonal direction, so that the motor can be reciprocally rotated in the rotation region without any conversion device for changing to a linear movement. In addition, it can be simply connected for use to the existing apparatus.

Moreover, since the concave portion and the convex portion are crossly formed at the front surface of the stator and the rotor, so that the contact area between the stator and the rotor is increased and the torque of the motor is also increased.

Furthermore, since the region where the motor is reciprocally rotated is controlled by controlling the AC power inputted to the motor, the operational speed of the compressor and the stroke can be controlled. Thus, the efficiency of the compressor is improved. Also, since no switching device is additionally installed to control the region where the motor is reciprocally rotated, its expense is reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An oscillating motor, comprising:
   a rotor;
   a stator;
   a plurality of first teeth formed on an inner circumferential surface of the stator, wherein each of the plurality of first teeth comprises at least one concave portion and at least one convex portion formed at an outer surface thereof; and
   a plurality of second teeth formed on an outer circumferential surface of the rotor, wherein each of the plurality of second teeth comprises at least one concave portion and at least one convex portion formed an outer surface thereof, and wherein the plurality of first teeth and the plurality of second teeth are configured to be engaged.

2. The oscillating motor of claim 1, further comprising a plurality of coils provided, respectively on the plurality of first teeth, and wherein coils on the opposite sides of the motor are electrically coupled to each other such that they can be simultaneously excited when a current is applied.

3. The oscillating motor of claim 1, wherein, the at least one concave portion and the at least one convex portion of the first teeth are alternately formed so as to increase a contact area between the rotor and the stator.

4. The oscillating motor of claim 1, wherein the at least one concave portion of the plurality of second teeth is configured to be engaged with a respective convex portion of the plurality of first teeth, and the at least one convex portion of the plurality of second teeth are configured to be engaged with a respective concave portion of the plurality of first teeth so as to distribute a magnetic flux in an axial and radial direction.

5. The oscillating motor of claim 1, wherein the rotor is configured to rotate in a direction such that when the plurality of first teeth are excited the rotor moves towards a position where a magnetic resistance approaches 0.

6. An oscillating motor, comprising:
   a stator having at least one first tooth extending from an inner circumferential surface of the stator; and
   a rotor configured to oscillate within the stator wherein at least one second tooth extends from an outer circumferential surface of the rotor, wherein the at least one second tooth is configured to engage with the first tooth, and wherein engagement of the at least one first tooth and the at least one second tooth distribute a magnetic flux that drives the rotor in both an axial and a radial direction.

7. The oscillating motor of claim 6, further comprising a coil provided on each at least one first tooth and configured to excite the at least one first tooth when a current is applied to the coil.

8. The oscillating motor of claim 6, wherein the at least one first tooth comprises a plurality of convex portions and a corresponding plurality of concave portions alternately formed on an outer surface of the at least one first tooth.

9. The oscillating motor of claim 8, wherein the at least one second tooth comprises a plurality of convex portions and a corresponding plurality of concave portions alternately formed on an outer surface of the at least one second tooth.

10. The oscillating motor of claim 9, wherein the plurality of convex portions of the at least one first tooth are configured to engage with the plurality of concave portions of the at least one second tooth, and wherein the plurality of convex portions of the at least one second tooth are configured to engage with the plurality of concave portions of the at least one first tooth.

11. The oscillating motor of claim 6, wherein the stator is substantially circular, and wherein the at least one first tooth comprises first and second pairs of teeth, and wherein the two teeth of each pair of teeth are formed on opposite sides of the stator at ends of a diameter extending across the stator.

12. The oscillating motor of claim 11, wherein the rotor is substantially circular, and wherein the at least one second tooth comprises first and second pairs of second teeth, and wherein the two teeth of each pair of second teeth are formed on opposite sides of the rotor at ends of a diameter extending across the rotor.

13. The oscillating motor of claim 6, wherein the rotor is configured to reciprocally rotate in a predetermined swing angle within the stator based on a voltage applied to the oscillating motor.

14. An oscillating motor, comprising:
a circular stator having a plurality of stator teeth arranged around an inner circumference of the stator, wherein each of the stator teeth projects inward in a radial direction, and wherein an inner end of each of the stator teeth has alternating convex and concave portions; and
a rotor configured to oscillate within the circular stator, wherein a plurality of rotor teeth are formed around the outer circumference of the rotor, wherein each of the rotor teeth projects outward in a radial direction, and wherein an outer end of each of the rotor teeth has alternating convex and concave portions which mesh with the convex and concave portions of the stator teeth.

15. The oscillating motor of claim 14, wherein the plurality of stator teeth are arranged in pairs, with the teeth of each pair being arranged on opposite sides of the stator.

16. The oscillating motor of claim 15, wherein a respective coil is arranged around each of the plurality stator teeth, and wherein the coils arranged around the teeth of any one pair of stator coils are electrically coupled such that they can be simultaneously actuated.

17. The oscillating motor of claim 14, wherein the convex portions of the stator teeth mesh with the concave portions of the rotor teeth, and wherein the convex portions of the rotor teeth mesh with the concave portions of the stator teeth.

18. The oscillating motor of claim 17, wherein the meshing concave and convex portions of the stator teeth and rotor teeth distribute a magnetic flux in both axial and radial directions.

19. The oscillating motor of claim 14, wherein the plurality of stator teeth are arranged in two pairs, with the two teeth of each pair being arranged on opposite sides of the circular stator, and wherein the plurality of rotor teeth comprise one pair of rotor teeth arranged on opposite sides of the rotor, and wherein the motor is configured such that the rotor teeth oscillate back and forth between the two pairs of stator teeth.

* * * * *